United States Patent
Chiu et al.

(10) Patent No.: US 12,306,036 B2
(45) Date of Patent: May 20, 2025

(54) OPTICAL DEVICES AND METHODS OF MANUFACTURE

(71) Applicant: Taiwan Semiconductor Manufacturing Co., Ltd., Hsinchu (TW)

(72) Inventors: Hua-Kung Chiu, Hsinchu (TW); Jia-Hong Wu, Hsinchu (TW); Hsing-Kuo Hsia, Jhubei (TW); Chen-Hua Yu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 18/473,434

(22) Filed: Sep. 25, 2023

(65) Prior Publication Data

US 2025/0102353 A1    Mar. 27, 2025

(51) Int. Cl.
*G01J 1/04*    (2006.01)

(52) U.S. Cl.
CPC ........... *G01J 1/0437* (2013.01); *G01J 1/0433* (2013.01)

(58) Field of Classification Search
CPC .............................. G01J 1/0437; G01J 1/0433
See application file for complete search history.

(56) References Cited

U.S. PATENT DOCUMENTS 6,151,114 A * 11/2000 Russell ..................... G01J 3/26
356/519
2021/0141159 A1    5/2021 Lee et al.

* cited by examiner

*Primary Examiner* — Tony Ko
(74) *Attorney, Agent, or Firm* — Slater Matsil, LLP

(57) ABSTRACT

Optical devices and methods of manufacture are presented herein. In an embodiment, an apparatus is provided that includes a notch filter, an optical signal detector positioned adjacent to the notch filter, and a mirror positioned to adjacent to the notch filter.

20 Claims, 5 Drawing Sheets

OPTICAL DEVICES AND METHODS OF MANUFACTURE

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating long-range optical components and short-range electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
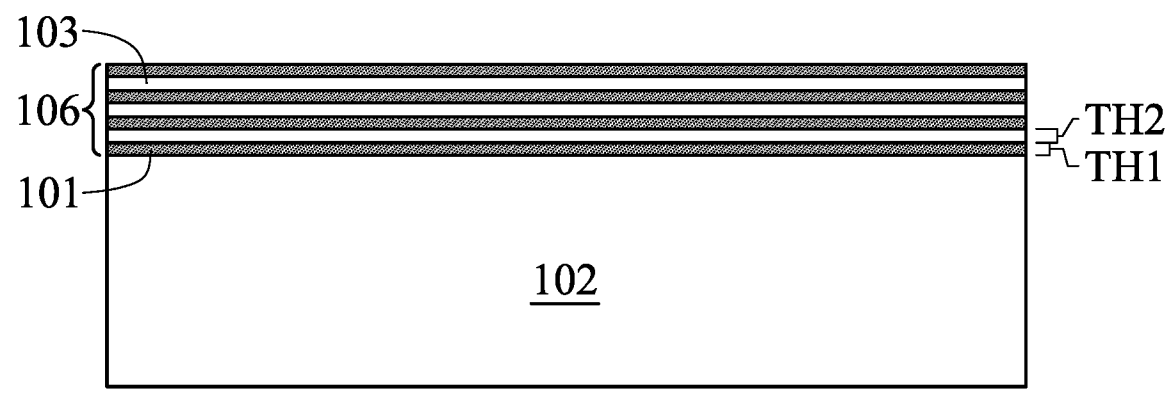
FIG. 1 illustrates an intermediate step in a formation of an optical signal measurement apparatus, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will now be discussed with respect to certain embodiments in which optical properties of a targeted optical signal are measured by introducing the targeted optical signal into an optical measurement apparatus that filters the targeted optical signal by various wavelengths. The filtered wavelengths are determined by controlling the materials and structural parameters of an optical phase based filter (e.g., a notch filter) as well as a sensitivity angle that the targeted optical signal is introduced to the optical phase based filter. However, the embodiments presented herein are intended to be illustrative and are not intended to limit the embodiments to the precise descriptions as discussed. Rather, the embodiments discussed may be incorporated into a wide variety of implementations, and all such implementations are fully intended to be included within the scope of the embodiments.

Figure 2:
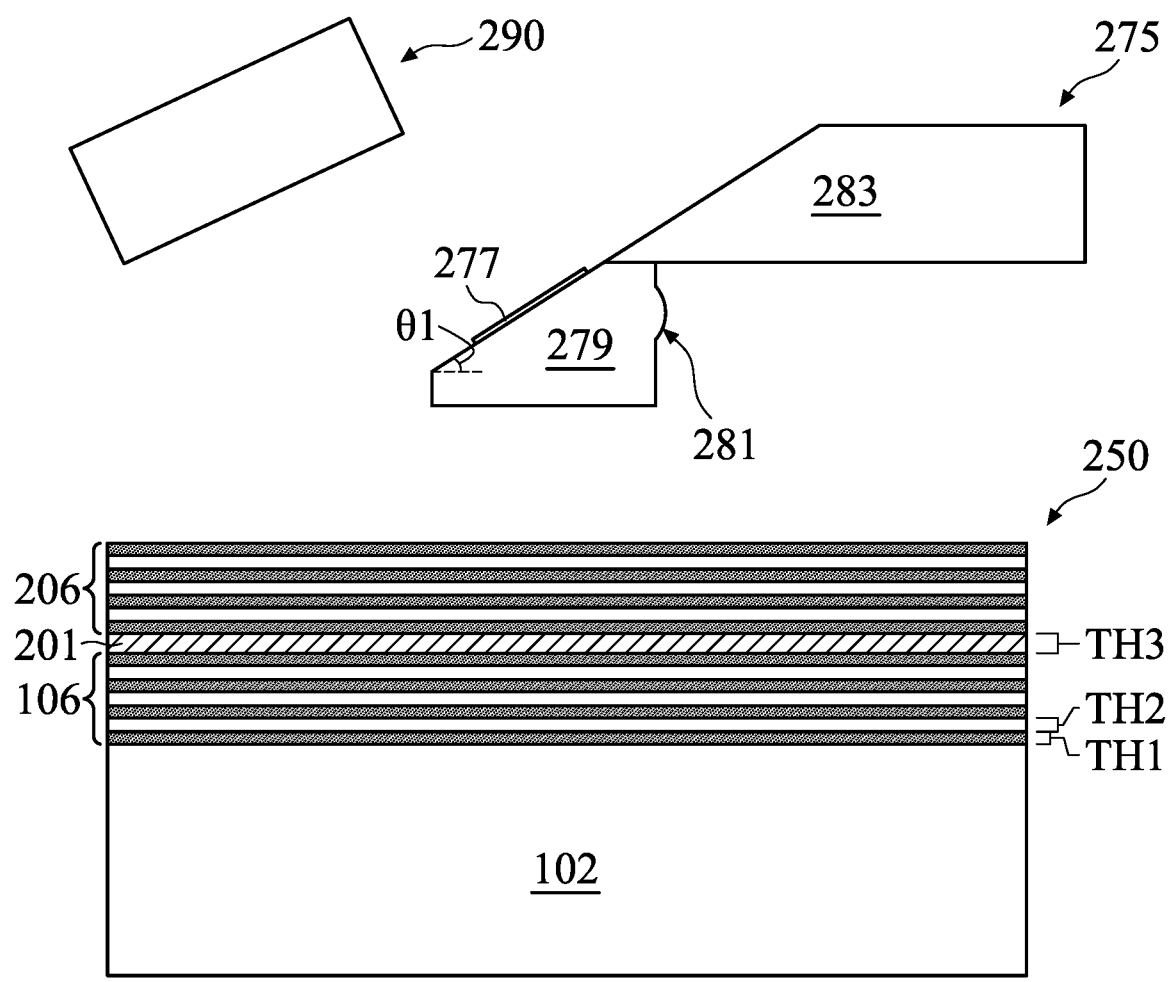
FIG. 2 illustrates the optical signal measurement apparatus comprising a notch filter, a reflection structure and an optical detector, in accordance with some embodiments.

FIG. 1 illustrates a cross-sectional view of an intermediate step in a formation of an optical signal measurement apparatus 200 (see FIG. 2). In an embodiment, a carrier substrate 102 is provided. The carrier substrate 102 may be a semiconductor substrate, such as a bulk semiconductor, a semiconductor-on-insulator (SOI) substrate, or the like, which may be doped (e.g., with a p-type or n-type dopant) or undoped. The carrier substrate 102 may be a wafer, such as a silicon wafer. In some embodiments, the semiconductor material of the carrier substrate 102 may include silicon, such as amorphous silicon (a-Si); germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. However, any suitable material may be utilized for the carrier substrate 102.

FIG. 1 further illustrates a first reflective structure 106 formed on the carrier substrate 102. In an embodiment, the first reflective structure 106 includes multiple layers of materials, such as dielectric materials and semiconductor materials. In an embodiment, the layers of materials alternate between first refractive index layers 101 and second refractive index layers 103.

The first refractive index layers 101 may be formed over the carrier substrate 102. In an embodiment, the first refractive index layers 101 may comprise a dielectric material, such as silicon nitride, silicon oxide, silicon oxynitride, SiCN, the like, or a combination thereof. In another embodiment, the first refractive index layers 101 may comprise a semiconductor material, such as silicon, such as amorphous silicon (a-Si); germanium; a compound semiconductor, such as silicon carbide, gallium arsenic, gallium phosphide, indium phosphide, indium arsenide, and/or indium antimonide; an alloy semiconductor such as, SiGe, GaAsP, AlInAs, AlGaAs, GaInAs, GaInP, and/or GaInAsP, the like, or combinations thereof. However, any suitable material may be utilized for the first refractive index layers 101. In an embodiment, the first refractive index layers 101 may be deposited by a suitable deposition process, such as chemical vapor deposition (CVD), physical vapor deposition (PVD), atomic layer deposition (ALD), combinations of these, or the like or may be grown by a suitable epitaxy process. However, any suitable deposition process or formation process may be utilized in forming the first refractive index layers 101.

In an embodiment, the material of the first refractive index layers 101 is selected to have a first refractive index. The first refractive index of the first refractive index layers 101 may be in a range of 1.3 to 3.7. In an embodiment, the first refractive index of the first refractive index layers 101 is a low refractive index. Further, in an embodiment, each of the first refractive index layers 101 may be formed to a first thickness TH1, the first thickness TH1 in a range of 80 nm to 260 nm. In an embodiment, the first thickness TH1 is relational to the first refractive index (RI1) and the wavelength ( ), for example, as described by the design function TH1=($\lambda$/4)/(RI1)=20%. If the first refractive index layers 101 have a thickness outside the range of the first thickness TH1, than the first refractive index layers may not have the desired highly reflective properties.

The second refractive index layers 103 may be formed over the first refractive index layers 101. In an embodiment, the second refractive index layers 103 are formed such that the layers of material of the first reflective structure 106 comprises alternating layers of the first refractive index layers 101 and of the second refractive index layers 103. In an embodiment, the second refractive index layers 103 may comprise a semiconductor material, such as silicon, such as amorphous silicon (a-Si); germanium; a compound semiconductor, such as silicon carbide, gallium arsenic, gallium phosphide, indium phosphide, indium arsenide, and/or indium antimonide; an alloy semiconductor such as, SiGe, GaAsP, AlInAs, AlGaAs, GaInAs, GaInP, and/or GaInAsP, the like, or combinations thereof. In another embodiment, the second refractive index layers 103 may comprise a dielectric material, such as silicon nitride, silicon oxide, silicon oxynitride, SiCN, the like, or a combination thereof. However, any suitable material may be utilized for the second refractive index layers 103. In an embodiment, the second refractive index layers 103 may be deposited by a suitable deposition process, such as CVD, PVD, ALD, combinations of these, or the like or may be grown by a suitable epitaxy process. However, any suitable deposition or formation process may be utilized in forming the second refractive index layers 103.

In an embodiment, the material of the second refractive index layers 103 is selected to have a second refractive index. The second refractive index of the second refractive index layers 103 may be in a range of 1.3 to 3.7. In an embodiment, the second refractive index of the second refractive index layers 103 is a high refractive index. Further, in an embodiment, each of the second refractive index layers 103 may be formed to a second thickness TH2. In an embodiment, the second thickness TH2 is in a range of 80 nm to 260 nm. In an embodiment, the second thickness TH2 is relational to the second refractive index (RI2) and the wavelength ($\lambda$), for example, as described by the design function TH2=($\lambda$/4)/(RI2)±20%. If the second refractive index layers 103 have a thickness outside the range of the second thickness TH2, than the second refractive index layers 103 may not have the desired highly reflective properties.

In an embodiment, the first refractive index layers 101 are formed of the dielectric materials and the second refractive index layers 103 are formed of the semiconductor materials. For example, in an embodiment, the first refractive index layers 101 are formed of $SiO_2$ and the second refractive index layers 103 are formed of a-Si. In an embodiment, the difference in materials between the first refractive index layers 101 and the second refractive index layers 103 produces desired differences in optical properties between the first refractive index layers 101 and the second refractive index layers 103 (e.g., the first refractive index layers 101 having the low refractive index and the second refractive index layers 103 having the high refractive index). In an embodiment, where the first refractive index layers 101 and the second refractive index layers 103 are formed from differing materials, the first thickness TH1 of the first refractive index layers 101 and the second thickness TH2 of the second refractive index layers 103 may be different and also contribute to the desired differences in optical properties between the first refractive index layers 101 and the second refractive index layers 103.

The embodiments discussed above is an example and embodiments are not limited to the first refractive index layers 101 having a lower refractive index and the second refractive index layers 103 having a higher refractive index; or the first refractive index layers 101 having a higher refractive index and the second refractive index layers 103 having a lower refractive index. The first refractive index layers 101 and the second refractive index layers 103 may have any suitable refractive index.

In an embodiment, the alternating layers of the first refractive index layers 101 and the second refractive index layers 103 forms the first reflective structure 106. The first reflective structure 106 may be referred to as a first distributed Bragg reflector (DBR). In an embodiment where the first refractive index layers 101 have the low refractive index and the second refractive index layers 103 have the high refractive index, constructive interference may occur at a boundary between the first refractive index layers 101 and the second refractive index layers 103. The alternating between the first refractive index layers 101 and the second refractive index layers 103 may produce a high reflection for optical signals (e.g., a collimated beam 400, not illustrated in FIG. 1, but illustrated in FIG. 4) directed at the first reflective structure 106.

FIG. 2 illustrates a cross-sectional view of additional structures of the optical signal measurement apparatus 200. In an embodiment, following the formation of the first reflective structure 106 over the carrier substrate 102, a defect structure 201 is formed over the top surface of the first reflective structure 106. Following the formation of the defect structure 201, a second reflective structure 206 may be formed over a top surface of the defect structure 201. In an embodiment, the first reflective structure 106, the defect structure 201, and the second reflective structure 206 form a notch filter 250. The notch filter 250 operates by reflecting most optical signals (e.g., a reflected light 425, not illustrated in FIG. 2, but illustrated in FIG. 4) from the collimated beam 400, but for optical signals with specific wavelengths (e.g., a transited light 450, not illustrated in FIG. 2, but illustrated in FIG. 4) at specific angles of incidence.

In an embodiment, the defect structure 201 operates within the notch filter 250 by providing an optical phase that destroys the high reflection (optical reflectivity) for optical signals of specific wavelengths at specific angles of incidence within the collimated beam 400. The defect structure 201 may destroy the high reflection for the specific wavelengths by having a defect refractive index. In an embodiment, the defect refractive index is in a range of 1.3 to 3.7. The defect refractive index of the defect structure 201 serves to destroy the high reflection by disrupting the optical phase at a boundary of the defect structure 201 within the notch filter 250 for specific wavelengths (e.g., the transited light 450) within the optical signal (e.g., the collimated beam 400).

In some embodiments, the defect structure 201 may be formed of a semiconductor material, such as silicon, such as amorphous silicon (a-Si); germanium; a compound semiconductor, such as silicon carbide, gallium arsenic, gallium phosphide, indium phosphide, indium arsenide, and/or indium antimonide; an alloy semiconductor such as, SiGe, GaAsP, AlInAs, AlGaAs, GaInAs, GaInP, and/or GaInAsP, the like, or combinations thereof. In some embodiments, the defect structure 201 may be formed a dielectric material, such as silicon nitride, silicon oxide, silicon oxynitride, SiCN, the like, or a combination thereof. Further, in some embodiments, the defect structure 201 may be formed of a single layer of material (e.g., a single layer of a-Si) or may be formed of multiple layers of material (e.g., two or more layers of silicon nitride).

In an embodiment, the defect refractive index is achieved by forming the defect structure 201 to a third thickness TH3. In an embodiment, the third thickness TH3 may be in a range of 50 nm to 2,000 nm. In one embodiment, the defect structure 201 may be formed of a material that is different from the material used to form the first refractive index layers 101 and the second refractive index layers 103. In an embodiment, the differing thickness of the defect structure 201 from both the first refractive index layers 101 and the second refractive index layers 103 produces the defect structure 201 with the defect refractive index that disrupts the optical phase for the specific wavelengths within the optical signal.

In another embodiment, the defect structure 201 may be formed of a material that is different from the material used to form the first refractive index layers 101 and the second refractive index layers 103 and the third thickness TH3 of the defect structure 201 may be different from the first thickness TH1 of the first refractive index layers 101 which may be different from the second thickness TH2 of the second refractive index layers 103. In this embodiment, the differing material of the defect structure 201 from both the first refractive index layers 101 and the second refractive index layers 103 as well as the differing thickness TH3 of the defect structure produces the defect structure 201 with the defect refractive index that disrupts the optical phase for the specific wavelengths within the optical signal.

In another embodiment, the defect structure 201 may be formed of a material that is the same as the material used to form the second refractive index layers 103. In this embodiment, the third thickness TH3 of the defect structure 201 is different from the second thickness TH2 of the second refractive index layers 103. In this embodiment, the differing thicknesses between the defect structure 201 and the second refractive index layers 103 produces the defect structure 201 with the defect refractive index that disrupts the optical phase for the specific wavelength within the optical signal.

FIG. 2 further illustrates a cross-sectional view of a reflective support structure 275 positioned to direct the optical signals (e.g., the collimated beam 400) towards an exterior surface of the notch filter 250. In an embodiment, the reflective support structure 275 comprises a mirror 277, a transmission structure 279, an optical signal capturing feature 281, and a supporting structure 283. The reflective support structure 275 may be configured to interface with an optical device 300 (not illustrated in FIG. 2 but illustrated in FIG. 3) and receive an optical signal (e.g., an optical device signal 410, not illustrated in FIG. 2, but illustrated in FIG. 4) from the optical device 300 and direct the optical signal (e.g., the collimated beam 400) towards the exterior surface the notch filter 250.

In an embodiment, the supporting structure 283 supports the mirror 277. The supporting structure 283 may be formed in such a manner as to hold the mirror 277 at a first angle θ1 from the exterior surface of the notch filter 250. The first angle θ1 dictates an angle (discussed further below with respect to FIG. 4) at which the optical signal (e.g., the collimated beam 400) interfaces with the notch filter 250 after being redirected by the mirror 277. In some embodiments, the first angle θ1 may be in a range of 1 degree to 89 degrees.

In an embodiment, the transmission structure 279 shares a same interface surface with the mirror 277 as the supporting structure 283. In an embodiment, the transmission structure 279 may be formed of a translucent material, such as a semiconductor material such as silicon, germanium, silicon germanium, combinations of these, or the like. The transmission structure 279 may also be formed with a dielectric material such as silicon nitride or the like. The transmission structure 279 may also be formed of a semiconductor material, be formed of air, or be formed of glass. The transmission structure 279 may be formed in such a manner as to receive the optical signal (e.g., the optical device signal 410) from the optical device 300, direct the optical signal (e.g., the collimated beam 400) towards the interface with the mirror 277, and then allow the optical signal (e.g., the collimated beam 400) to pass through the transmission structure 279 after being redirected by the mirror 277 towards the exterior surface of the notch filter 250.

In an embodiment, part of the transmission structure 279 is the optical signal capturing feature 281. The optical signal capturing feature 281 may be positioned on an exterior surface of the transmission structure 279 and configured to receive the optical device signal 410 from the optical device 300. In some embodiments, the optical signal capturing feature 281 is an integrated feature of the transmission structure 279 and is formed as part of the transmission structure 279 during the formation of the transmission structure 279. In an embodiment, the optical signal capturing feature 281 is a collimating feature, wherein the collimating feature serves to receive the optical device signal 410 from the optical device 300 and focus the optical device signal 410 into the collimated beam 400 which is then subsequently directed towards the notch filter 250. In an embodiment, the optical device signal 410 is a non-collimated signal produced by the optical device 300 that is collimated by the optical signal capturing feature 281 to produce the collimated beam 400. In some embodiments, the optical signal capturing feature 281 may be a collimating lens formed by shaping the material of the transmission structure 279 using masking and etching processes. However, it should be noted that other optical components may be utilized in serving as the optical signal capturing feature 281. Further, any suitable process and material may be utilized in forming the optical signal capturing feature 281.

In some embodiments, the mirror 277 may be formed by plating a reflective material over the interface surface, or by embedding the mirror 277 within the reflective support structure 275 at the interface surface. In an embodiment the mirror may be formed from a reflective material such as, copper, a copper alloy, aluminum, an aluminum alloy, gold, a gold alloy, titanium, a titanium alloy, combinations of these, or the like. In some embodiments, the reflective material can be formed from a combination of dielectric or semiconductor materials to form a highly reflective film stack, such as amorphous silicon, silicon, silicon oxide, silicon oxynitride, SiCN, the like, or a combination thereof. In an embodiment where the mirror 277 is primarily used to increase the intensity of the optical signal of the collimated beam 400, the mirror 277 may be only localized on the surface of the transmission structure 279. However, any suitable material or process may be used in the formation of the mirror 277 in the reflective support structure 275. In some embodiments, the mirror 277 is formed to be positioned at the first angle θ1 such that the mirror 277 redirects the optical signal (e.g., the collimated beam 400) towards the exterior surface of the notch filter 250. In an embodiment, the optical signal (e.g., the collimated beam 400) has specific angles of incidence with the notch filter 250 after being redirected toward the notch filter 250 by the mirror 277.

In an embodiment where the light (e.g., the optical device signal 410) from the optical signal capturing feature 281, incident on the reflective surface of the mirror 277 and the normal direction of an incident angle θ0 from the reflective surface of the mirror 277 is greater than a critical angle, the total reflection phenomenon occurs, the reflective surface of the mirror 277 does not need to make special mirrors. In this embodiment, the transmission structure 279 surface can be used directly for reflection to accomplish the high reflection effect.

FIG. 2 additionally illustrates an optical detector 290 as part of the optical signal measurement apparatus 200. In an embodiment, the optical detector 290 is positioned to receive an optical signal (e.g., the reflected light 425) from the notch filter 250. The optical detector 290 may capture the optical signal for measurement. In an embodiment, the optical detector 290 may be a camera utilized to capture the reflected light 425 as the reflected light 425 reflects back off the notch filter 250. In an embodiment, the optical detector 290 may be one or more charge-coupled devices that can detect the reflected light 425 from the notch filter 250. In an embodiment, the optical detector 290 detects light field distribution information of the reflected light 425 and the light field distribution information can be used for analysis of the information such as mode field diameter, divergence angle, etc. Additionally, the optical detector 290 may also comprise structures such as lenses or other optics which help to separate the incoming reflected light 425 into different frequencies and directing the different frequencies to different charged coupled devices. Such separation allows for multiple images to be taken simultaneously. In an embodiment, the optical detector 290 measures various optical properties of the reflected light 425 such as optical path angle, optical intensity, spot size, and optical divergence angle.

Figure 3:
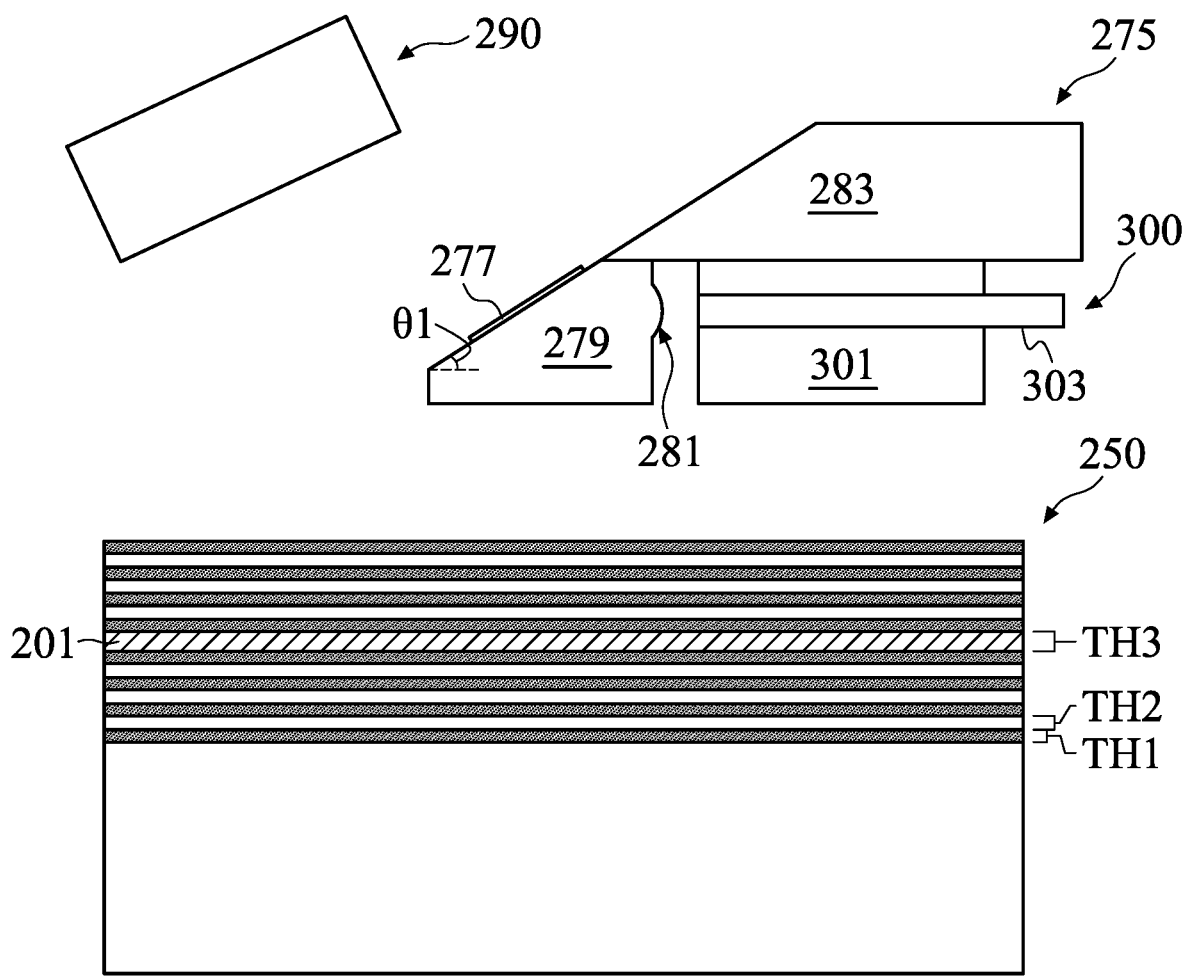
FIG. 3 illustrates an optical signal device interfacing with the optical signal measurement apparatus, in accordance with some embodiments.

FIG. 3 illustrates a cross-sectional view of the optical device 300 interfacing with the optical signal measurement apparatus 200. In an embodiment, the optical device 300 comprises optical device structural component 301 and an optical device signal component 303. The optical device signal component 303 may provide the optical device signal 410 to be measured by the optical signal measurement apparatus 200. The optical device structural component 301 may provide support to the optical device signal component 303 as well as provide a structure for affixing the optical device 300 to the reflective support structure 275. The optical device structural component 301 may be structured in such a manner as to align the optical device signal component 303 with the optical signal capturing feature 281 of the reflective support structure 275.

In one embodiment, the optical device 300 may comprise a fiber array unit (FAU) (not separately illustrated). In this embodiment, the optical device signal component 303 of the FAU may comprise one or more optical fibers (not separately illustrated). In an embodiment each of the one or more optical fibers may comprise a core material such as glass surrounded by one or more cladding materials. Optionally, a surrounding cover material may be used to surround the outer cladding material in order to provide additional protection.

Further in the embodiment in which the optical device 300 comprises a fiber array unit, the optical device structural component 301 may be a ferrule (not separately illustrated) that is attached to the fiber bundle of optical fibers. In an embodiment, the ferrule may be used to receive the plurality of optical fibers, align the optical fibers, and connect the optical fibers to the reflective support structure 275. In an embodiment, the ferrule may be a mechanical transfer (MT) ferrule and the like made of a material that can be used to protect, support and align the individual optical fibers. However, any suitable materials may be utilized. In an embodiment, the optical fibers may be inserted into openings located within the ferrule. Once inserted a glue material, such as an epoxy, silicone, a photocurable elastic polymer, combinations of these, or the like, may be injected or otherwise placed into the openings within the ferrule in order to secure the optical fibers within the ferrule. Additionally, a curing process such as a light cure, a heat cure, or the like, may be utilized to harden the glue material, and the optical fibers may be polished and cleaned in order to prepare the optical fibers within the ferrule for optical connection to the optical signal measurement apparatus 200. In this embodiment, the ferrule helps secure the optical fibers to the reflective support structure 275 such that an optical signal provided by the optical fibers may be measured by the optical signal measurement apparatus 200.

In another embodiment, the optical device 300 may be a photonic integrated circuit (PIC) device incorporated within, e.g., an optical engine. In an embodiment, the PIC device comprises an active layer of optical components (not separately illustrated) and optical and electrical interconnect structures (not separately illustrated), and is bonded to an electronic integrated circuit (EIC) (not separately illustrated). In an embodiment, the electrical interconnect structures may include metallization lines and vias for electrical connection between the active layer and the EIC as well as electrical contacts for electrical connections to outside of the PIC device. The optical interconnect structures may include optical components such as waveguides and couplers. In an embodiment, the EIC may comprise a single semiconductor die (e.g., a single memory die), a stacked device that includes multiple, interconnected semiconductor substrates, or other functional circuitry packages. In an embodiment, the active layer may comprise of optical components such as like optical waveguides, couplers, modulators, amplifiers, multiplexors, demultiplexors, optical-to-electrical converters, electrical-to-optical converters, lasers, combinations of these, or the like. In an embodiment, the PIC device generates an optical device signal 410 that is transmitted out of the PIC device through an optical component within the PIC device, such as an edge coupler, to be captured by the optical signal capturing feature 281.

Figure 4:
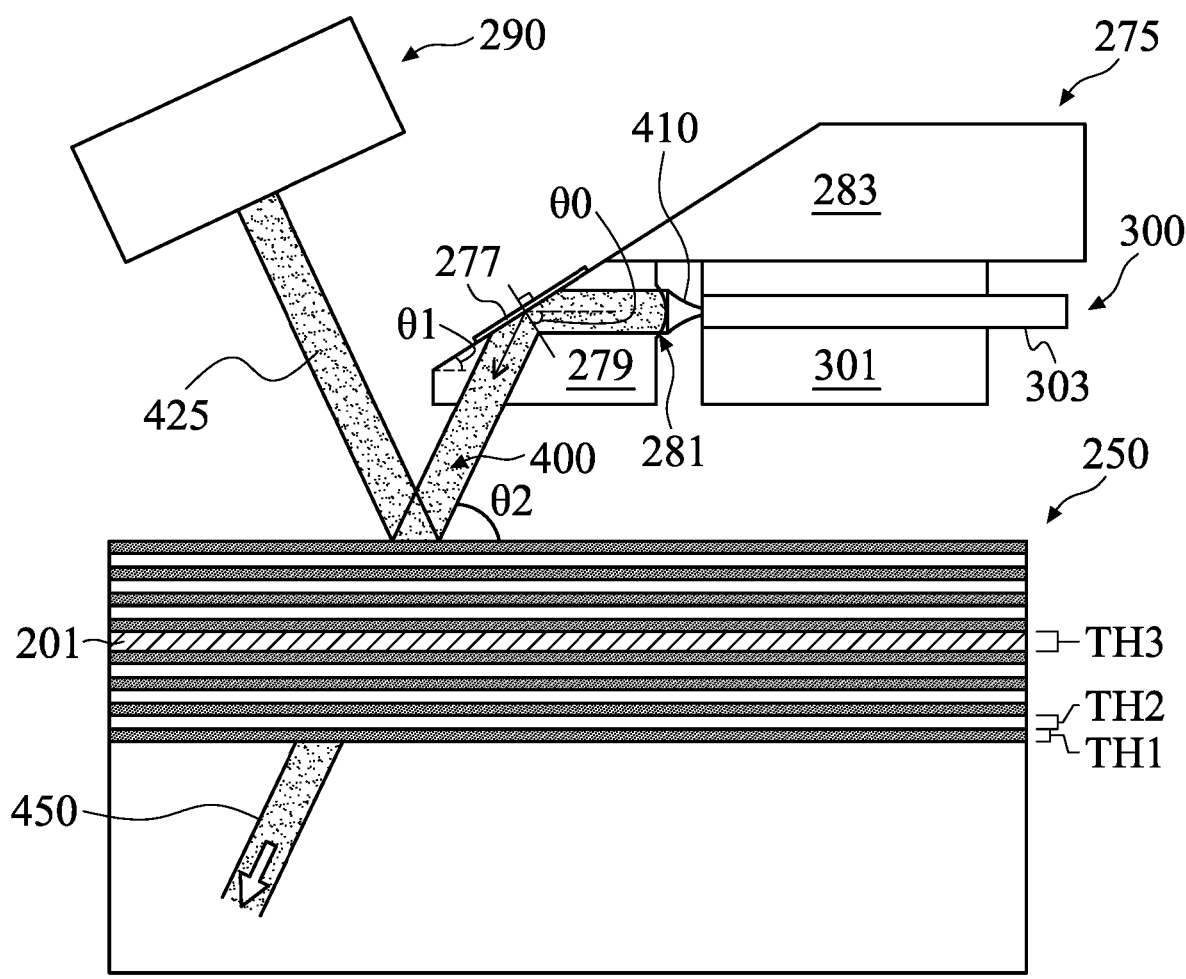
FIG. 4 illustrates an optical signal provided by the optical signal device entering the optical signal measurement apparatus, in accordance with some embodiments.

FIG. 4 illustrates a cross-sectional view of the optical device 300 affixed to the optical signal measurement apparatus 200 at the reflective support structure 275 and the optical device signal 410 being provided by the optical device 300 to the optical signal measurement apparatus 200.

Further, FIG. 4 illustrates a path of the optical device signal 410 through the optical signal measurement apparatus 200, in which along the path the optical device signal 410 is collimated into the collimated beam 400 by the optical signal capturing feature 281 and the collimated beam 400 is split by the notch filter 250 into the reflected light 425 and the transited light 450. In an embodiment, the optical signal capturing feature 281 captures the optical device signal 410 from the optical device 300, the optical signal capturing feature 281 focusing the optical device signal 410 into the collimated beam 400, and passes the collimated beam 400 through the transmission structure 279 where the collimated beam 400 intersects with a reflective surface of the mirror 277. In an embodiment, the collimated beam 400 is reflected off the reflective surface of the mirror 277 through the transmission structure 279 towards the exterior surface of the notch filter 250. After the collimated beam 400 passes through the reflective support structure 275 and is reflected by the mirror 277 towards the exterior surface of the notch filter 250, the collimated beam 400 intersects the notch filter 250 at a second angle θ2. In an embodiment, the second angle θ2 is in a range of 2 degrees to 178 degrees. In an embodiment, the second angle θ2 is the angle the collimated beam 400 intersects with the exterior surface of the notch filter 250. In an embodiment, the mirror 277 is positioned at the first angle θ1 from the exterior surface of the notch filter 250 such that when the collimated beam 400 reflects off the mirror 277 the collimated beam 400 intersects the notch filter 250 at the second angle θ2.

In an embodiment, the optical device signal 410 comprises signals with a first set of wavelengths, the first set of wavelengths in a range from 1,000 nm to 1,700 nm. Further, the collimated beam 400 may also comprise of the signals of the first set of wavelengths. The reflected light 425 may comprise of a second set of wavelengths, the second set of wavelengths in a range from 1,000 nm to 1,700 nm. The transited light 450 may comprise of a third set of wavelengths, the third set of wavelengths in a range from 1,000 nm to 1,700 nm.

In an embodiment, the notch filter 250 has the defect structure 201 with the defect refractive index such that when the collimated beam 400 interacts with the notch filter 250 the collimated beam 400 is split into the reflected light 425 and the transited light 450. In this embodiment, the defect refractive index of the defect structure 201 disrupts the optical phase of specific wavelengths of the collimated beam 400 producing the transited light 450. In an embodiment, the light incident from the collimated beam 400 to the notch filter 250 will be phase-matched by the design of the first reflective structure 106, the defect structure 201, and the second reflective structure 206, so that the reflected light 425 from each layer of the notch filter 250 is phase-matched, allowing most of the reflected light 425 to be reflected to the optical detector 290. In embodiments, the addition of the defect structure 201 disrupts the phase-matching properties of the reflected light 425 for some conditions (for example a specific wavelengths or a specific angle of incidence for the second angle θ2), most of the light will pass right through the notch filter 250, thus reducing the light reflectivity under these wavelength or the specific second angle θ2 conditions.

Figure 5:
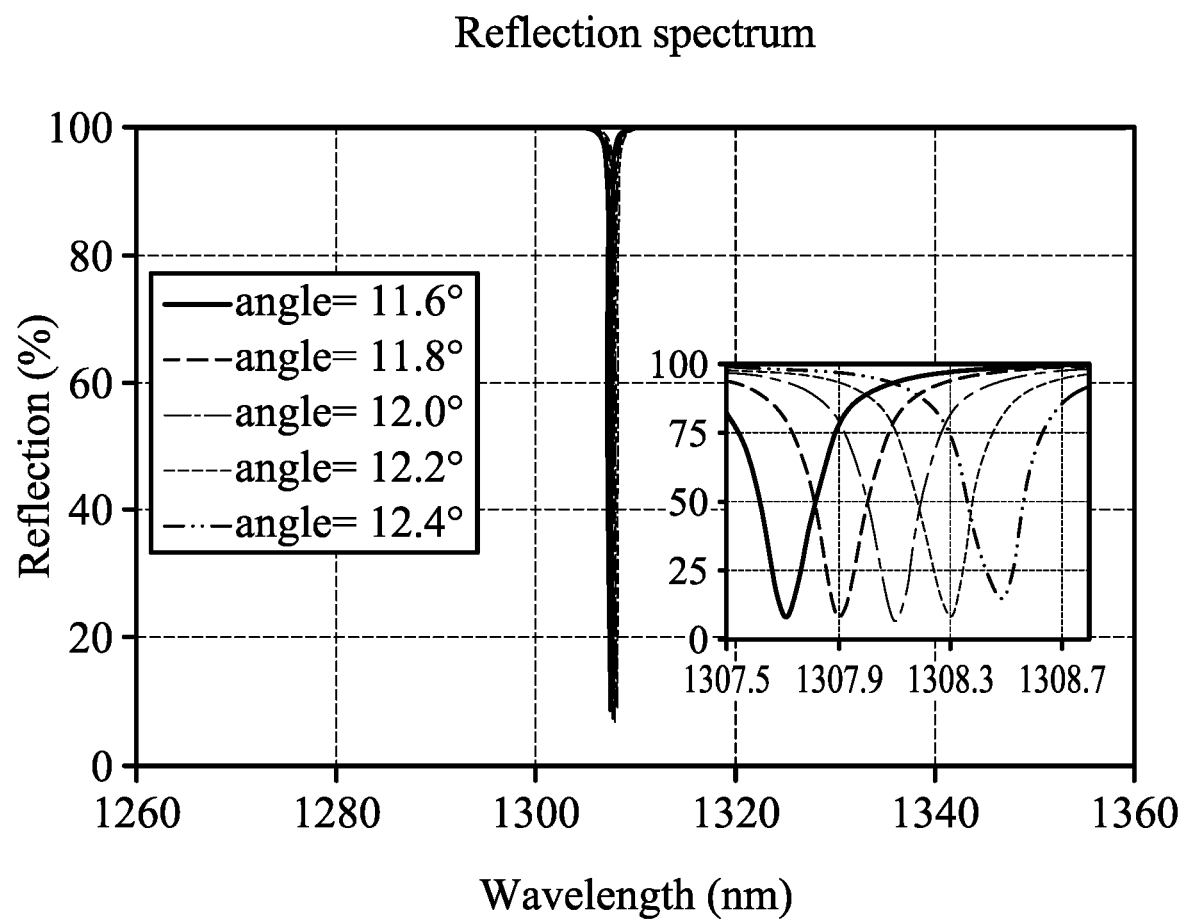
FIG. 5 illustrates a reflection spectrum of the optical signal as measured by the optical signal measurement apparatus, in accordance with some embodiments.

FIG. 5 is a spectrum of the reflected light 425 received from the collimated beam 400 incident on the notch filter 250 at different second angles θ2 and then utilizing the optical detector 290. In an embodiment, the collimated beam 400 interacts with the notch filter at a first subset of the second angle θ21, such as 11.6 degrees a majority of the transited light 450 comprises an optical signal with a wavelength 1,307.7 nm. In an embodiment, the collimated beam 400 interacts with the notch filter 250 at a second subset of the second angle θ22, such as 11.8 degrees a majority of the transited light 450 comprises an optical signal with a wavelength 1,307.9 nm. In an embodiment, the collimated beam 400 interacts with the notch filter 250 at a third subset of the second angle θ23, such as 12.0 degrees a majority of the transited light 450 comprises an optical signal with a wavelength 1,308.1 nm. In an embodiment, the collimated beam 400 interacts with the notch filter 250 at a fourth subset of the second angle θ24, such as 12.2 degrees a majority of the transited light 450 comprises an optical signal with a wavelength 1,308.3 nm. In an embodiment, the collimated beam 400 interacts with the notch filter 250 at a fifth subset of the second angle θ25, such as 12.4 degrees a majority of the transited light 450 comprises an optical signal with a wavelength 1,308.5 nm.

Embodiments discussed herein achieve benefits. By controlling the material and structural properties of the defect structure 201, a specific wavelength of light can be filtered from the collimated beam 400 at a specific second angles θ2. By applying the collimated beam 400 to the notch filter 250 at these specific angles, direct measurements can be made using an optical detector 290. This approach allows for a straightforward method to measure optical path angle, optical intensity, spot size, and optical divergence angles of optical devices 300 (e.g., FAUs and PIC devices) without limitations derived from optical fiber size tolerance, structure error, camera resolution, etc. Directly measuring the optical signal (e.g., the collimated beam 400) allows for the quality and reliability of the optical signal to be more accurately observed.

In accordance with an embodiment, an apparatus includes a notch filter, an optical signal detector positioned adjacent to the notch filter, and a mirror positioned adjacent to the notch filter. In an embodiment, wherein the notch filter includes a first distributed Bragg reflector (DBR) stack on a substrate, a defect structure on the first DBR stack, and a second DBR stack on the defect structure. In an embodiment, wherein the first DBR stack includes: a plurality of first layers, wherein at least one layer of the plurality of first layers is in physical contact with the substrate and at least one layer of the plurality of first layers is in physical contact with the defect structure, and a plurality of second layers, wherein each layer of the plurality of first layers alternates with each layer of the plurality of second layers. In an embodiment, wherein each layer of the plurality of first layers includes a first material and each layer of the plurality of second layers comprises a second material, wherein the second material is different from the first material. In an embodiment, wherein the defect structure includes the second material. In an embodiment, wherein each layer of the plurality of second layers has a first thickness and the defect structure has a second thickness, wherein the second thickness is different from the first thickness. In an embodiment, wherein the defect structure includes dielectric material or semiconductor material.

In accordance with an embodiment, a method includes forming a notch filter, positioning a reflective structure, wherein after the forming the notch filter the reflective structure is positioned adjacent to the notch filter, and positioning an optical signal detector, wherein after the forming the notch filter, the optical signal detector is positioned adjacent to the notch filter. In an embodiment, wherein the forming the notch filter includes forming a first distributed Bragg reflector (DBR) over a substrate, forming a defect layer over the first DBR, and forming a second DBR over the defect layer. In an embodiment, wherein forming the first DBR includes forming a first layer over the substrate, the first layer including a first material, and forming a second layer over the first layer, the second layer including a second material, wherein the first material is different than the second material. In an embodiment, wherein the first material is a dielectric material or a semiconductor material and the second material is dielectric material or a semiconductor material. In an embodiment, wherein the forming the second layer forms the second layer to a first thickness and the forming the defect layer forms the defect layer to a second thickness, the second thickness being different from the first thickness. In an embodiment, wherein the defect layer includes the second material. In an embodiment, wherein the second material is amorphous silicon.

In accordance with an embodiment, a method includes reflecting an optical signal towards a notch filter, selectively reflecting a first portion of the optical signal out of the notch filter, selectively passing a second portion of the optical signal out of the notch filter, wherein the first portion is different from the second portion, and capturing the first portion of the optical signal with an optical detector. In an embodiment, wherein the optical signal is provided by a photonic integrated circuit device. In an embodiment, wherein the optical signal is provided by a fiber array unit. In an embodiment, further including collimating the optical signal before the reflecting the optical signal. In an embodiment, wherein the notch filter comprises a first distributed Bragg reflector, a second distributed Bragg reflector, and a defect layer, wherein the defect layer is between the first distributed Bragg reflector and a second distributed Bragg reflector. In an embodiment, wherein the capturing the first portion of the optical signal comprises uses a camera.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus comprising:
a notch filter;
an optical signal detector positioned adjacent to the notch filter; and
a mirror positioned adjacent to the notch filter, wherein the notch filter comprises:
a first distributed Bragg reflector (DBR) stack on a substrate;
a defect structure on the first DBR stack; and
a second DBR stack on the defect structure.

2. The apparatus of claim 1, wherein the first DBR stack comprises:
a plurality of first layers, wherein at least one layer of the plurality of first layers is in physical contact with the substrate and at least one layer of the plurality of first layers is in physical contact with the defect structure; and
a plurality of second layers, wherein each layer of the plurality of first layers alternates with each layer of the plurality of second layers.

3. The apparatus of claim 2, wherein each layer of the plurality of first layers comprises a first material and each layer of the plurality of second layers comprises a second material, wherein the second material is different from the first material.

4. The apparatus of claim 3, wherein the defect structure comprises the second material.

5. The apparatus of claim 4, wherein each layer of the plurality of second layers has a first thickness and the defect structure has a second thickness, wherein the second thickness is different from the first thickness.

6. The apparatus of claim 1, wherein the defect structure comprises dielectric material or semiconductor material.

7. The apparatus of claim 1, wherein the defect structure has a defect refractive index in a range of 1.3 to 3.7.

8. A method comprising:
forming a notch filter, wherein the forming the notch filter comprises:
first distributed Bragg reflector (DBR) over a substrate;
forming a defect layer over the first DBR; and
forming a second DBR over the defect layer;
positioning a reflective structure, wherein after the forming the notch filter the reflective structure is positioned adjacent to the notch filter; and
positioning an optical signal detector, wherein after the forming the notch filter, the optical signal detector is positioned adjacent to the notch filter.

9. The method of claim 8, wherein forming the first DBR comprises:
forming a first layer over the substrate, the first layer comprising a first material; and
forming a second layer over the first layer, the second layer comprising a second material, wherein the first material is different than the second material.

10. The method of claim 9, wherein the first material is a dielectric material or a semiconductor material and the second material is dielectric material or a semiconductor material.

11. The method of claim 9, wherein the forming the second layer forms the second layer to a first thickness and the forming the defect layer forms the defect layer to a second thickness, the second thickness being different from the first thickness.

12. The method of claim 11, wherein the defect layer comprises the second material.

13. The method of claim 12, wherein the second material is amorphous silicon.

14. The method of claim 8, wherein the forming the defect layer comprises forming two or more layers of silicon nitride.

15. A method comprising:
reflecting an optical signal towards a notch filter;
selectively reflecting a first portion of the optical signal out of the notch filter;
selectively passing a second portion of the optical signal out of the notch filter, wherein the first portion is different from the second portion; and
capturing the first portion of the optical signal with an optical detector.

16. The method of claim 15, wherein the optical signal is provided by a photonic integrated circuit device.

17. The method of claim 15, wherein the optical signal is provided by a fiber array unit.

18. The method of claim 15, further comprising collimating the optical signal before the reflecting the optical signal.

19. The method of claim 15, wherein the notch filter comprises a first distributed Bragg reflector, a second distributed Bragg reflector, and a defect layer, wherein the defect layer is between the first distributed Bragg reflector and a second distributed Bragg reflector.

20. The method of claim 15, wherein the capturing the first portion of the optical signal comprises uses a camera.

* * * * *